(12) United States Patent
Reagor et al.

(10) Patent No.: US 9,638,827 B2
(45) Date of Patent: May 2, 2017

(54) DIRECTIONAL ANTENNAS FOR ELECTROMAGNETIC MAPPING IN A BOREHOLE

(71) Applicants: David Wesley Reagor, Los Alamos, NM (US); Doan Ngoc Nguyen, Los Alamos, NM (US); Stephen Paul Ashworth, Gallicano (IT)

(72) Inventors: David Wesley Reagor, Los Alamos, NM (US); Doan Ngoc Nguyen, Los Alamos, NM (US); Stephen Paul Ashworth, Gallicano (IT)

(73) Assignees: LOS ALAMOS NATIONAL SECURITY, LLC, Los Alamos, NM (US); CHEVRON U.S.A. INC., San Ramon, CA (US)

( * ) Notice: Subject to any disclaimer, the term of this patent is extended or adjusted under 35 U.S.C. 154(b) by 178 days.

(21) Appl. No.: 14/498,511

(22) Filed: Sep. 26, 2014

(65) Prior Publication Data

US 2016/0091628 A1    Mar. 31, 2016

(51) Int. Cl.
*G01V 3/28* (2006.01)

(52) U.S. Cl.
CPC ..................... *G01V 3/28* (2013.01)

(58) Field of Classification Search
CPC .......................................... G01V 3/28
USPC ................................. 324/333–339
See application file for complete search history.

(56) References Cited

U.S. PATENT DOCUMENTS

| 5,491,488 A | 2/1996 | Wu et al. | |
| 5,508,616 A * | 4/1996 | Sato | G01V 3/28 324/343 |
| 5,781,436 A * | 7/1998 | Forgang | G01V 3/28 324/343 |
| 6,100,696 A | 8/2000 | Sinclair | |
| 6,297,639 B1 * | 10/2001 | Clark | G01V 3/30 324/338 |
| 6,304,086 B1 * | 10/2001 | Minerbo | G01V 3/28 324/338 |
| 6,677,756 B2 | 1/2004 | Fanini et al. | |
| 6,952,101 B2 * | 10/2005 | Gupta | G01V 3/30 166/254.1 |
| 7,095,232 B2 | 8/2006 | Haber | |
| 7,141,981 B2 | 11/2006 | Folberth et al. | |
| 7,416,032 B2 | 8/2008 | Moeny | |
| 7,554,329 B2 | 6/2009 | Gorek et al. | |
| 7,598,742 B2 | 10/2009 | Synder et al. | |
| 8,030,936 B2 | 10/2011 | Hall et al. | |
| 8,138,943 B2 | 3/2012 | Kusko | |
| 8,278,928 B2 | 10/2012 | Bespalov | |
| 8,466,682 B2 | 6/2013 | Wang | |

(Continued)

*Primary Examiner* — Jay Patidar
(74) *Attorney, Agent, or Firm* — King & Spalding LLP

(57) ABSTRACT

A bottom hole assembly used for a field operation is disclosed herein. The bottom hole assembly can include at least one directional antenna disposed on an outer surface of a first tubing pipe of a tubing string, where the at least one directional antenna receives a first electric current from at least one power source, where the first electric current generates a first magnetic field that radiates from the at least one directional antenna into a formation. The bottom hole assembly can also include at least one receiver disposed on a second tubing pipe of the tubing string, where the at least one receiver receives the first magnetic field returning from the formation.

14 Claims, 12 Drawing Sheets

(56) References Cited

U.S. PATENT DOCUMENTS

| | | |
|---|---|---|
| 2001/0011590 A1 | 8/2001 | Thomas |
| 2004/0113626 A1* | 6/2004 | Wang .................. G01V 3/28 |
| | | 324/339 |
| 2004/0183538 A1* | 9/2004 | Hanstein ............... G01V 3/28 |
| | | 324/339 |
| 2006/0186888 A1* | 8/2006 | Wang .................. G01V 3/28 |
| | | 324/338 |
| 2008/0018334 A1* | 1/2008 | Reiderman ......... E21B 47/0905 |
| | | 324/346 |
| 2009/0179649 A1 | 7/2009 | Schmidt |
| 2010/0125439 A1 | 5/2010 | Reiderman et al. |
| 2010/0176812 A1 | 7/2010 | Bittar et al. |
| 2011/0074427 A1* | 3/2011 | Wang .................. G01V 3/28 |
| | | 324/339 |
| 2011/0221442 A1* | 9/2011 | Maurer ................ G01V 3/28 |
| | | 324/338 |
| 2011/0238312 A1 | 9/2011 | Seydoux et al. |
| 2013/0126240 A1 | 5/2013 | Johnston et al. |
| 2014/0176274 A1* | 6/2014 | Chiang ................ H01F 38/14 |
| | | 336/170 |
| 2015/0015265 A1* | 1/2015 | Seydoux .............. G01V 3/28 |
| | | 324/339 |

\* cited by examiner

DIRECTIONAL ANTENNAS FOR ELECTROMAGNETIC MAPPING IN A BOREHOLE

ACKNOWLEDGMENT OF GOVERNMENT SUPPORT

This invention was made with government support under Contract No. W-7405-ENG-36 awarded by the U.S. Department of Energy. The government has certain rights in the invention.

PARTIES TO JOINT RESEARCH AGREEMENT

The research work described here was performed under a Cooperative Research and Development Agreement (CRADA) between Los Alamos National Security LLC (LANS) and Chevron U.S.A., Inc. under the LANL-Chevron Alliance, CRADA number LA05C10518.

TECHNICAL FIELD

Embodiments of the invention relate generally to field operations, and in particular, methods and systems of evaluating subterranean formations.

BACKGROUND

When performing a field operation in a subterranean formation (sometimes more simply called a "formation" herein), it is important to continuously gather information about the subterranean formation. As a field operation continues, the subterranean formation can change. Knowing when these changes in the subterranean formation occur and knowing the characteristics of the subterranean formation over the duration of the field operation can provide a number of benefits, including but not limited to optimizing eventual production of the field, avoiding failures and inefficiencies in the operation, and preserving safety.

SUMMARY

In general, in one aspect, the disclosure relates to a bottom hole assembly used for a field operation. The bottom hole assembly can include at least one directional antenna disposed on an outer surface of a first tubing pipe of a tubing string, where the at least one directional antenna receives a first electric current from at least one power source, where the first electric current generates a first magnetic field that radiates from the at least one directional antenna into a formation in the field. The bottom hole assembly can also include at least one receiver disposed on a second tubing pipe of the tubing string, where the at least one receiver receives the first magnetic field returning from the formation.

In another aspect, the disclosure can generally relate to a bottom hole assembly used for a field operation. The bottom hole assembly can include a first axial coil disposed in line with a tubing string, where the first axial coil receives a first electric current from at least one power source, where the first electric current generates a first magnetic field that radiates from the first axial coil in an axial direction along the tubing string. The bottom hole assembly can also include a directional antenna disposed adjacent to the first axial coil and having at least one gap in the axial direction, where the first magnetic field radiates through the at least one gap in the directional antenna into a formation in the field operation. The bottom hole assembly can further include at least one receiver disposed on the tubing string, where the at least one receiver receives the first magnetic field returning from the formation.

In yet another aspect, the disclosure can generally relate to a method for electromagnetically mapping a borehole using directional antennas during a field operation. The method can include generating a magnetic field from within a tubing string during the field operation, where the magnetic field is generated by an electric current flowing through at least one coil, where the electric current is delivered by at least one power source. The method can also include directing, during the field operation using at least one directional antenna, the magnetic field from the tubing string into a formation. The method can further include receiving, using at least one receiver disposed on the tubing string, the magnetic field returning from the formation during the field operation.

These and other aspects, objects, features, and embodiments will be apparent from the following description and the appended claims.

BRIEF DESCRIPTION OF THE DRAWINGS

The drawings illustrate only example embodiments of directional antennas (the term used herein for more than one antenna) for electromagnetic mapping in a borehole and are therefore not to be considered limiting of its scope, as directional antennas for electromagnetic mapping in a borehole may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
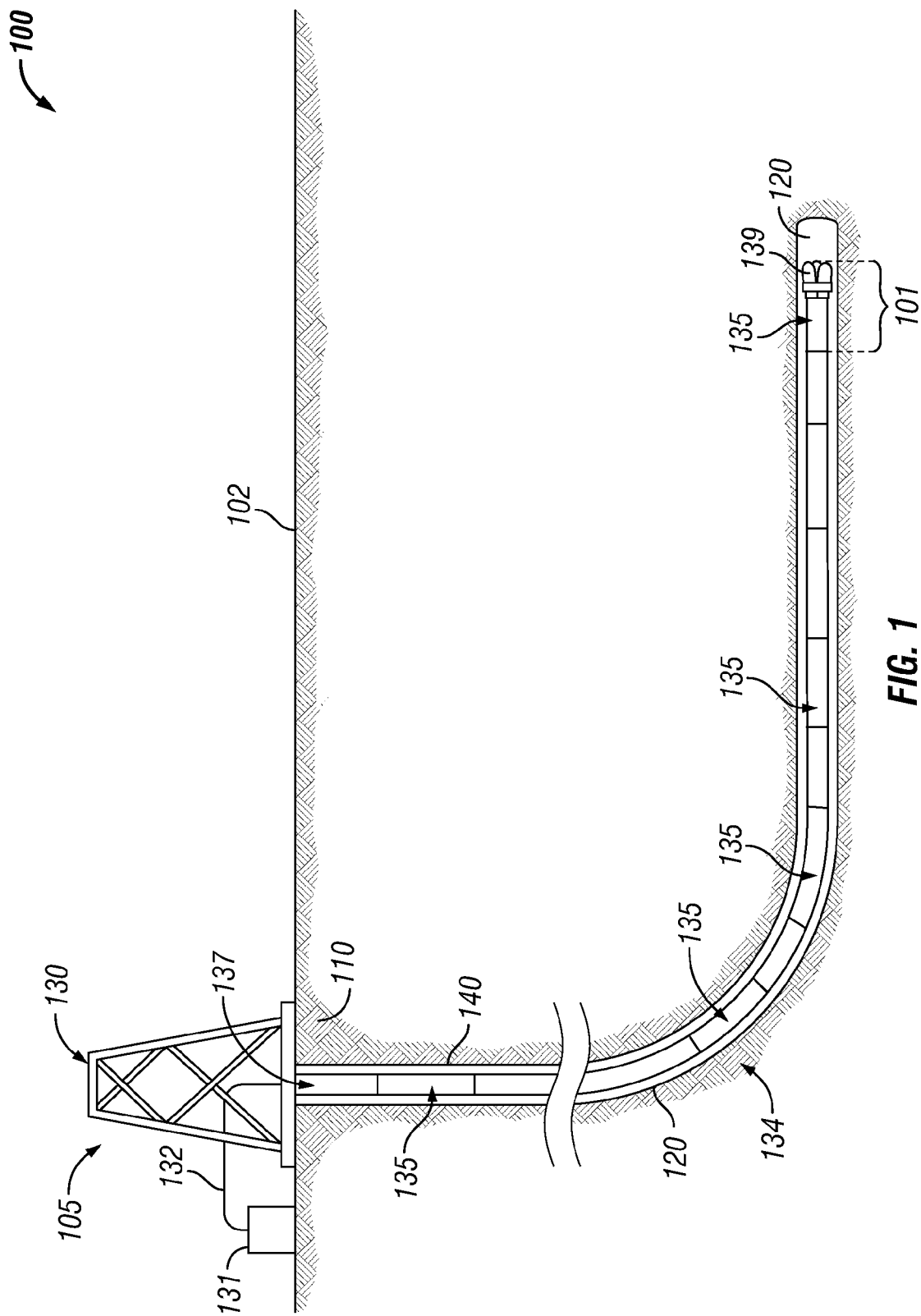
FIG. 1 shows a schematic diagram of a system in which directional antennas for electromagnetic mapping in a borehole can be used in accordance with certain example embodiments.

The example embodiments discussed herein are directed to systems, apparatuses, and methods of electromagnetically mapping a borehole using directional antennas. While the example directional antennas for electromagnetic mapping in a borehole shown in the Figures and described herein are directed to wellbores drilled to extract hydrocarbon resources from a subterranean formation, example embodiments can be used in wellbores drilled to serve other purposes. Examples of such other purposes can include, but are not limited to, extraction of water and extraction of geothermal resources from a subterranean formation.

Example embodiments can measure one or more electrical properties (e.g., resistivity) of the formation surrounding a borehole. Specifically, example embodiments use one or more transmitting antennas that are directional and electronically steerable, combined with conventional vector receivers. This differs from currently-used technology, which uses coils that act as a dipole, and so are not directional or steerable. The current art is not directional or steerable because the configuration of the borehole and the bottom hole assembly greatly restrict transmitting time dependent magnetic fields (or, more simply, magnetic fields) in directions that are substantially perpendicular to the axis of the borehole.

Currently-used technologies rely on the fact that the configuration of the borehole and the bottom hole assembly are built around a steel core (tubing string) that has a high magnetic susceptibility, and this can be used to guide and direct a magnetic field in a direction axial with the configuration of the borehole and the bottom hole assembly. Thus, in the currently known art, antennas can only be large along the axis of the borehole. By contrast, example embodiments described herein use the magnetic field generated by the steel core of the bottom hole assembly in combination with directional antennas. These example directional antennas have relatively small transverse dimensions, but generate a relatively large magnetic field anisotropy with ranges on the order of the height of the example directional antenna.

Example embodiments also use the high susceptibility of the steel of the bottom hole assembly to direct a magnetic field ahead of the drill bit at the end of the bottom hole assembly. While example embodiments are described herein as being disposed as part of the bottom hole assembly (i.e., toward the distal end of the drill string or tubing string within the borehole), in some cases example embodiments can be disposed at any other point along the drill string, which also have high susceptibility.

As defined herein, a directional antenna is an antenna capable of generating electromagnetic waves that are transmitted in a direction that is antiparallel (e.g., substantially perpendicular) to the axial direction of the bottom hole assembly. Example directional antennas can generate and transmit electromagnetic waves. Alternatively, example directional antennas can receive a time dependent magnetic field generated by another source (e.g., an axial coil) and redirect such time dependent magnetic field in a substantially different direction. For example, if an axial coil generates and transmits a time dependent magnetic field axially along the length of a bottom hole assembly, an example directional antenna (e.g., a side coil) can redirect the time dependent magnetic field by some angle (e.g., 30°, 90°) from the length-wise axial direction of the bottom hole assembly.

A user as described herein may be any person that is involved with extracting and/or controlling one or more production fluids in a wellbore of a subterranean formation of a field operation. Examples of a user may include, but are not limited to, a company representative, a drilling engineer, a tool pusher, a service hand, a field engineer, an electrician, a mechanic, an operator, a consultant, a contractor, a roughneck, and a manufacturer's representative. As defined herein, a field can be a location, a geographic area, one or more projects, and/or any other suitable designation. A field can include a vertical profile that can include a surface, extend to some depth within a subterranean formation below the surface, and/or extend into the air above the surface. Example embodiments described herein can be placed in harsh downhole environments. Such downhole environments can expose example embodiments a number of adverse factors, including but not limited to high temperatures, high pressures, hard and jagged materials, rotational movement, and extreme forces. Example embodiments are designed to withstand such adverse factors for extended periods of time.

Example embodiments of directional antennas for electromagnetic mapping in a borehole will be described more fully hereinafter with reference to the accompanying drawings, in which example embodiments of directional antennas for electromagnetic mapping in a borehole are shown. Directional antennas for electromagnetic mapping in a borehole may, however, be embodied in many different forms and should not be construed as limited to the example embodiments set forth herein. Rather, these example embodiments are provided so that this disclosure will be thorough and complete, and will fully convey the scope of directional antennas for electromagnetic mapping in a borehole to those of ordinary skill in the art. Like, but not necessarily the same, elements (also sometimes called modules) in the various figures are denoted by like reference numerals for consistency.

Terms such as "first," "second," "end," "inner," "outer," "top," "bottom," and "distal" are used merely to distinguish one component (or part of a component or state of a component) from another. Such terms are not meant to denote a preference or a particular orientation. Also, the names given to various components described herein are descriptive of example embodiments and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment. For each of the figures described below, one or more of the features shown in a figure may be omitted, added, repeated, and/or substituted. Accordingly, embodiments shown in such figure should not be considered limited to the specific arrangements of components shown in such figure.

FIG. 1 shows a schematic diagram of a field system 100 in which evaluating subterranean formations using electromagnetic ground probes can be used in accordance with one or more example embodiments. The field system 100 in this example includes a single well 105. The well 105 can include a wellbore 120 (also called a borehole 120) that is formed in a subterranean formation 110 using field equipment 130 located (at least originally) above a surface 102, such as ground level for an on-shore application and the sea floor for an off-shore application. The point where the borehole 120 begins at the surface 102 can be called the entry point. The subterranean formation 110 can include one or more of a number of formation types, including but not limited to shale, limestone, sandstone, clay, sand, and salt. In certain embodiments, a subterranean formation 110 can also include one or more reservoirs in which one or more resources (e.g., oil, gas, water, steam) can be located. One or more of a number of field operations (e.g., drilling, setting casing, extracting production fluids) can be performed to reach an objective of a user with respect to the subterranean formation 110.

The borehole 120 of the well 105 can have one or more of a number of segments, where each segment can have one or more of a number of dimensions. Examples of such dimensions can include, but are not limited to, a size (e.g., diameter) of the borehole 120, a curvature of the borehole 120, a total vertical depth of the borehole 120, a measured depth of the borehole 120, and a horizontal displacement of the borehole 120. The borehole 120 is bounded by a wall 140 of the formation 110. The field equipment 130 can be used to create and/or develop (e.g., insert a working fluid into, extract production fluids from) the borehole 120. The field equipment 130 can be positioned and/or assembled at the surface 102. The field equipment 130 can include, but is not limited to, a derrick, a tool pusher, a clamp, a tong, drill pipe (also called tubing pipe), a drill bit, a slip, an injection device, completion equipment, centralizers, a riser, tubing pipe 135 (also simply called tubing), a power source, a packer, a snubbing unit, a wireline unit, a coil-tubing unit, and casing pipe.

A number of tubing pipes 135 that are coupled to each other and inserted into the borehole 120 can be called a tubing string 134. The tubing pipes 135 of the tubing string 134 are mechanically coupled to each other end-to-end, usually with mating threads. The tubing pipes 135 of the tubing string 134 can be mechanically coupled to each other directly or using a coupling device, such as a coupling sleeve or an isolator sub (both not shown). Each tubing pipe 135 of the tubing string 134 can have a length and a width (e.g., outer diameter). The length of a tubing pipe 135 can vary. For example, a common length of a tubing pipe 135 is approximately 30 feet. The length of a tubing pipe 135 can be longer (e.g., 40 feet) or shorter (e.g., 10 feet) than 30 feet.

The width of a tubing pipe 135 can also vary and can depend on one or more of a number of factors, including but not limited to the target depth of the borehole 120, the total length of the borehole 120, and the curvature of the borehole 120. The width of a tubing pipe 135 can refer to an outer diameter, an inner diameter, or some other form of measurement of the tubing pipe 135. Examples of a width in terms of an outer diameter can include, but are not limited to, 7 inches, 5 inches, and 4 inches. The walls of the tubing pipe 135 have an inner surface that forms a cavity 137 that traverses the length of the tubing pipe 135. The tubing pipe 135 can be made of one or more of a number of suitable materials, including but not limited to steel.

At the distal end of the tubing string 134 within the borehole 120 is a bottom hole assembly (sometimes referred to herein as a "BHA") 101. The BHA 101 can include a drill bit 139 at the far distal end. The drill bit 139 is used to extend the borehole 120 in the formation 110 by cutting into the formation 110. The BHA 101 can include one or more other components, including but not limited to tubing pipe 135, a measurement-while-drilling tool, a wrench flat, an axial coil, and an example directional antenna. During a field operation that involves drilling (extending the borehole 120), the tubing string 134, including the BHA 101, can be rotated by other field equipment 130.

The field equipment 130 can also include a power source 131 and a delivery device 132. The power source 131 can be any device (e.g., generator, battery) capable of generating electric power that can be delivered to an electrical device (e.g., an axial coil, a directional antenna) positioned within the borehole 120. In certain example embodiments, the power source 131 is electrically coupled to one or more delivery devices 132, which delivers the power generated by the power source 131. Examples of such delivery devices 132 can include, but are not limited to, an electrical cable and the tubing string 134. Also, while the power source 131 is shown above the surface 102 in FIG. 1, the power source 131 can be located elsewhere, such as in the BHA 101. The power provided by a power source 131 can be alternating current (AC) power or, in some cases (such as in the embodiments shown in FIGS. 2-9 below) direct current (DC) power. AC power creates variable time dependent magnetic fields, and DC power creates substantially constant magnetic fields.

Figure 2:
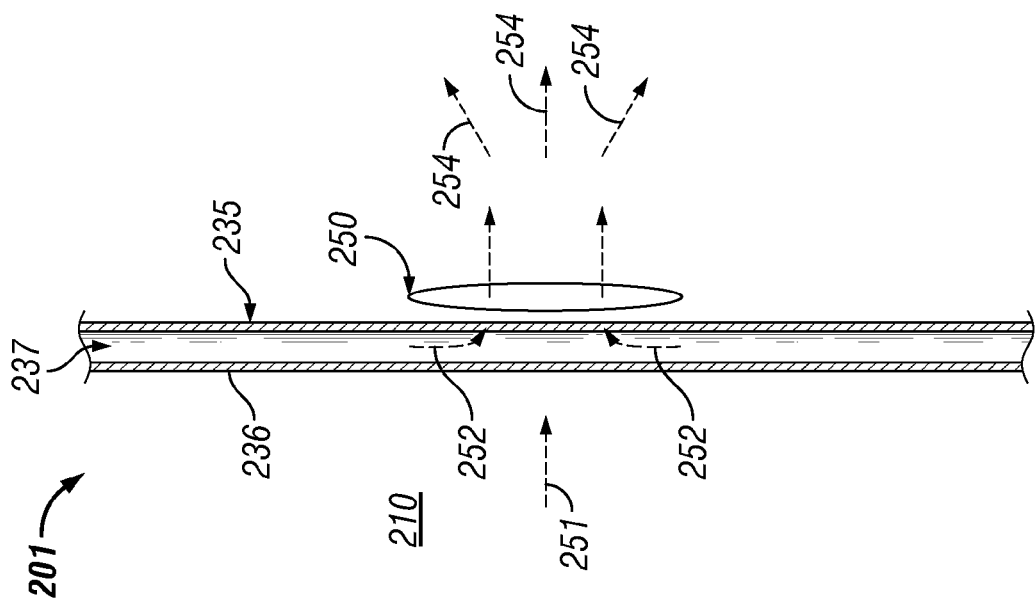
FIG. 2 shows a loop antenna the magnetic fields that it generates when energized with a current that, in combination with other antenna elements, produces a highly directional magnetic field in accordance with certain example embodiments.

FIG. 2 shows a portion of a bottom hole assembly 201 that includes a directional antenna 250 (also sometimes called a directional antenna element 250) for electromagnetic mapping in a borehole in accordance with certain example embodiments. Referring to FIGS. 1 and 2, the portion of the bottom hole assembly 201 shown in FIG. 2 is a portion of a tubing pipe 235 of a tubing string. The tubing pipe 235 of FIG. 2 is substantially the same as the tubing pipe 135 of FIG. 1 described above. In certain example embodiments, one or more directional antenna elements 250 can be disposed on the outer surface 236 of the tubing pipe 235. In this case, there is only one directional antenna element 250 disposed on the outer surface 236 of the tubing pipe 235. In such a case, the tubing pipe 235 can have a relatively large magnetic susceptibility, and the tubing pipe 235 can be insulated from the directional antenna element 250. In this case, the directional antenna element 250 can be a coil (also called a side coil) made of an electrically conductive material (e.g., aluminum, copper).

The directional antenna element 250 can be coupled to the outer surface 236 of the tubing pipe 235 using one or more of a number of coupling methods, including but not limited to epoxy, welding, fastening devices, compression fittings, mating threads, and slotted fittings. Each directional antenna element 250 and the tubing pipe 235 can be mechanically coupled to each other in one or more of a number of ways, including but not limited to fixedly, hingedly, removeably, slidably, and threadably. The directional antenna element 250 can have any of a number of shapes (e.g., rectangular, as in this case, oval, triangular) and/or sizes. In some cases, the dimensions (e.g., length, width) of the directional antenna element 250 can be proportional to the distance from the directional antenna element 250 into the subterranean formation 110 that a magnetic field can travel before returning to a receiver, as described below with respect to FIG. 14.

By being disposed on the outer surface 236 of the tubing pipe 235, the directional antenna element 250 is orientated substantially orthogonal to the axis along the length of the tubing pipe 235. In certain example embodiments, the directional antenna element 250 generates time dependent magnetic fields. In such a case, the directional antenna element 250 receives electric power from a power source (e.g., power source 131) through a delivery device 132 (e.g., an electrical cable). When electrical current flows through the directional antenna element 250, the directional antenna element 250 is an electromagnet, and the directional antenna element 250 generates time dependent magnetic fields. Further, the configuration of the directional antenna element 250 allows any time dependent magnetic fields generated by the directional antenna element 250 to be transmitted outward (substantially orthogonally) from the tubing pipe 235.

For example, as shown in FIG. 2, when the directional antenna element 250 is energized (receives electric power), the directional antenna element 250 draws a magnetic field (from the left in FIG. 2) toward the directional antenna element 250. Specifically, magnetic fields 252 are drawn from within the cavity 237 and/or walls of the tubing pipe 235 in an axial direction along the length of the tubing pipe 235 from both directions toward the directional antenna element 250. When these magnetic fields 252 reach the directional antenna element 250, the directional antenna element 250 redirects these magnetic fields 252 outward away from the tubing pipe 235, so that the magnetic fields 252 become magnetic fields 254 that flow through the subterranean formation 210.

Similarly, the directional antenna element 250 can draw magnetic fields (e.g., magnetic field 251) from the subterranean formation 210, through the tubing pipe 235, and outward through the directional antenna element 250, becoming magnetic fields 254. When the magnetic susceptibility of the tubing pipe 235 is large, the magnitude of the magnetic field 251 is small. Conversely, the magnitude of the magnetic field 251 can be small when the magnetic susceptibility of the tubing pipe 235 is small. The magnitude of the magnetic fields 252 and 254 can vary based on one or more of a number of factors, including but not limited to the amount of current flowing through the directional antenna element 250, the shape and size (e.g., dimensions) of the directional antenna element 250, the material of the directional antenna element 250, and the susceptibility of the tubing pipe 235.

In certain example embodiments, a tubing pipe (e.g., the tubing pipe 235 of FIG. 2, another tubing pipe 235 of the tubing string) can have disposed thereon one or more other components that work in conjunction with example embodiments. For example, as described below with respect to FIG. 14, one or more receivers (e.g., magnetometers) can be disposed on one or more tubing pipes within range of the magnetic field generated by example embodiments so that the receivers can offer a return path for and receive the magnetic fields propagated into the subterranean formation 110 by example embodiments.

Figure 3:
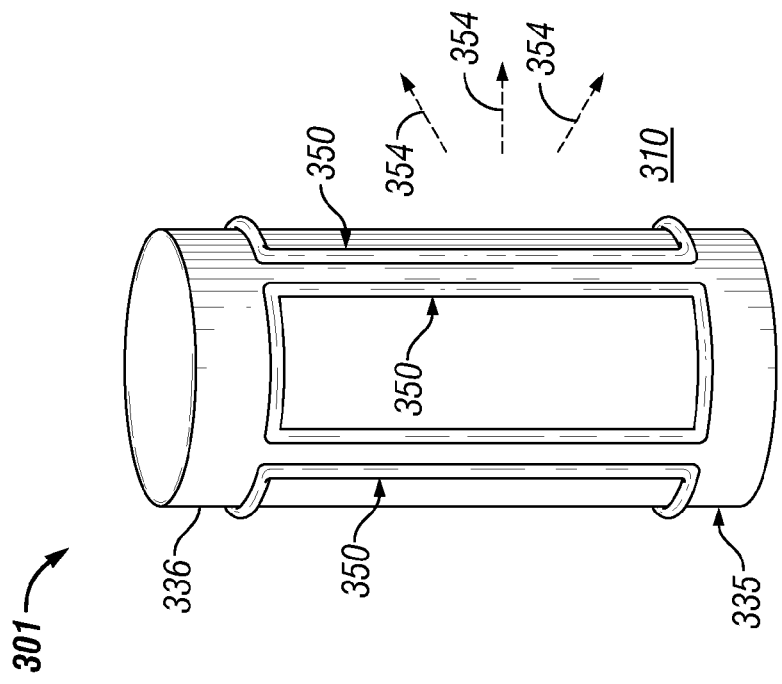
FIG. 3 shows a number of directional antennas for electromagnetic mapping in a borehole in accordance with certain example embodiments.

FIG. 3 shows a portion of a BHA 301 that includes a number of directional antennas 350 for electromagnetic mapping in a borehole in accordance with certain example embodiments. Referring to FIGS. 1-3, the portion of the bottom hole assembly 301 shown in FIG. 3 is a portion of a tubing pipe 335 of a tubing string. The tubing pipe 335 and directional antenna elements 350 of FIG. 3 are substantially the same as the tubing pipe 235 and directional antenna element 250 of FIG. 2, except as described below. In this case, there are four directional antenna elements 350 disposed on the outer surface 336 of the tubing pipe 335. In this case, the shape and size of each directional antenna element 350 is substantially the same as the shape and size of the other three directional antenna elements 350. Further, the directional antenna elements 350 are positioned symmetrically around the outer surface 336 of the tubing pipe 335.

As with the directional antenna element 250 of FIG. 2, each directional antenna element 350 of FIG. 3 can be active (receive electrical power (e.g., current) to generate magnetic fields) or passive (receive no electrical power and not generate magnetic fields, but have the ability to redirect magnetic fields generated from another source). When a directional antenna element 350 is energized (is active or receives electrical power), the amount of electrical power can be constant or varied. In such a case, the amount of electrical power (e.g., current) delivered to a directional antenna element 350 can vary based on input from a user, the occurrence of some event (e.g., passage of time, rotation of the tubing pipe 335), an algorithm in a control system, or some other factor. For example, when there are multiple directional antenna elements 350, as in FIG. 3, the current flowing through the directional antenna element 350 to generate a magnetic field that radiates from that directional antenna element 350 is greater than the current that flows through each of the other directional antenna elements 350.

Further, when multiple directional antenna elements 350 are energized, the amount of electrical power received by one directional antenna element 350 can differ from the amount of electrical power received by one or more of the other directional antennas. In such a case, any number of power sources (e.g., power source 131) can feed one or more of the active directional antenna elements 350. For example, there may be a separate power source for each active directional antenna element 350. As another example, there may be a single power source feeding all active directional antenna elements 350.

When there are differing amounts of power flowing through the directional antenna elements 350, the magnetic field can be steerable. Put another way, if the power flowing through the directional antenna elements 350 is equal, the directional antenna elements 350 act as dipole antennas. In such a case, the receivers receiving the magnetic field cannot distinguish differences in the subterranean formation 110 because the magnetic field is evenly distributed around the tubing pipe 335. By contrast, when the power delivered to the directional antenna elements 350 varies at a given point in time, a magnetic field can be radiated from the tubing pipe 335 into the subterranean formation 110 in one or more particular directions at that point in time. Thus, different readings (e.g., resistivity) of particular areas of the subterranean formation 110, based on the time dependent magnetic fields received by receivers, can be determined.

As an example, to project magnetic fields 354 outward from the directional antenna element 350 on the right side of FIG. 3 into the subterranean formation 310, electrical power is fed to the directional antenna element 350 on the right side. In addition, a reduced amount of electrical power, with current flowing in the opposite direction, can be fed to the directional antenna element 350 on the left side of FIG. 3. In such a case, the anisotropy is optimized such that there are no magnetic fields flowing through the tubing pipe 335 from left of the tubing pipe 335 (similar to the magnetic field 251 of FIG. 2 above). In addition, the directional antenna element 350 facing the front of the tubing pipe 335 and the directional antenna (hidden from view in FIG. 3) facing the rear of the tubing pipe 335 can be passive (receive no electrical power) to create the steerable magnetic fields 354 flowing out of the directional antenna element 350 on the right side of FIG. 3 into the subterranean formation 310.

Figure 4:
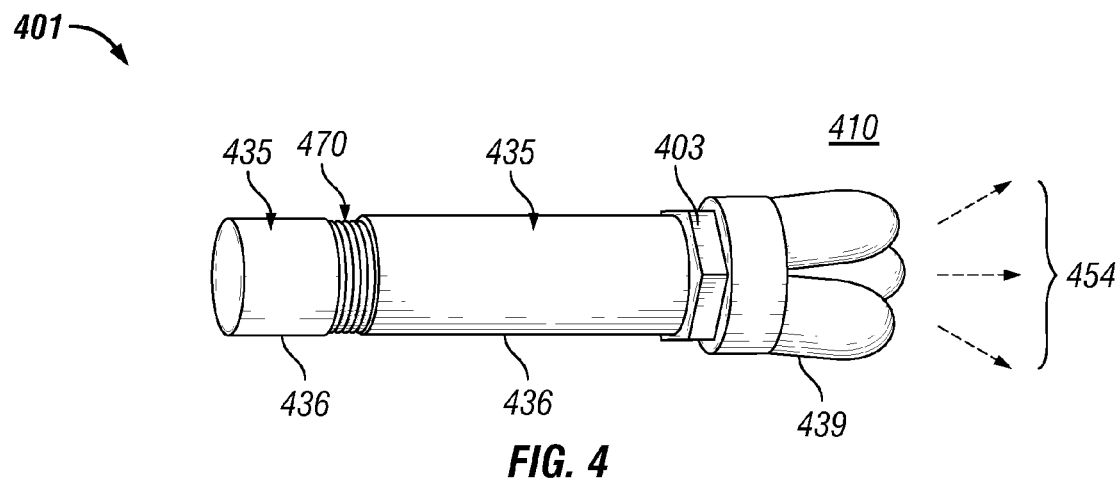
FIG. 4 shows another directional antenna for electromagnetic mapping in a borehole in accordance with certain example embodiments.

FIG. 4 shows a portion of a BHA 401 that includes an axial coil for electromagnetic mapping in a borehole in accordance with certain example embodiments. Referring to FIGS. 1-4, the portion of the bottom hole assembly 401 shown in FIG. 4 is a portion of a tubing pipe 435 of a tubing string, an axial coil 470, an entire tubing pipe 435, one or more wrench flats 403, and a drill bit 439. The tubing pipes 435 of FIG. 4 are substantially the same as the tubing pipe 335 of FIG. 3.

The axial coil 470 (also sometimes called a drive coil 470) is disposed between the two tubing pipes 435 of FIG. 4. The axial coil 470 can be a separate component of the BHA 401. In addition, or in the alternative, the axial coil 470 can be disposed on (e.g., wound around the outer surface 436 of) one or more tubing pipes 435. In the latter case, the axial coil 470 can be coupled to the outer surface 436 of a tubing pipe 435 using one or more of a number of coupling methods, including but not limited to epoxy, welding, fastening devices, compression fittings, mating threads, and slotted fittings. Each axial coil 470 and the tubing pipe 435 can be mechanically coupled to each other in one or more of a number of ways, including but not limited to fixedly, hingedly, removeably, slidably, and threadably.

If the axial coil 470 is a separate component, the axial coil 470 can have one or more dimensions that are substantially similar to the corresponding dimensions of an adjacent tubing pipe 435. For example, the outer diameter and inner diameter of the axial coil 470 can be substantially the same as the outer diameter and inner diameter of one or both of the adjacent tubing pipes 435. Conversely, one or more dimensions of the axial coil 470 can be different than a corresponding dimension of an adjacent tubing pipe 435. For example, the length of the axial coil 470 can be less than the length of one or both of the adjacent tubing pipes 435. The axial coil 470 can include one or more coupling features (e.g., mating threads) disposed at each end that allow the axial coil 470 to mechanically couple to adjacent components (in this case, tubing pipes 435) of the BHA 401.

In certain example embodiments, the axial coil 470 generates time dependent magnetic fields 454. In such a case, the axial coil 470 receives electric power from a power source (e.g., power source 131) through a delivery device (e.g., delivery device 132, such as an electrical cable). When electrical current flows through the axial coil 470, the axial coil 470 is an electromagnet, and the axial coil 470 generates time dependent magnetic fields 454. Further, the configuration of the axial coil 470 allows any time dependent magnetic fields generated by the axial coil 470 to be transmitted axially along the length of the BHA 401. The axial coil 470 can transmit time dependent magnetic fields from one or both ends of the axial coil 470. If the axial coil 470 transmits time dependent magnetic fields from only one end, the axial coil 470 can be oriented within the BHA 401 so that the time dependent magnetic fields generated by the axial coil 470 are transmitted in a particular direction. For example, as shown in FIG. 4, the axial coil 470 can be oriented so that the time dependent magnetic fields 454 generated by the axial coil 470 are directed through the drill bit 439.

The time dependent magnetic fields 454 generated by the axial coil 470 can be guided by the high susceptibility material of the axial coil 470 and/or the adjacent tubing pipe 435 into the subterranean formation 410. The magnitude of the time dependent magnetic fields 454 can vary based on one or more of a number of factors, including but not limited to the amount of current flowing through the axial coil 470, the shape and size (e.g., dimensions) of the axial coil 470, the material of the axial coil 470, and the susceptibility of the adjacent tubing pipe 435.

Figure 5:
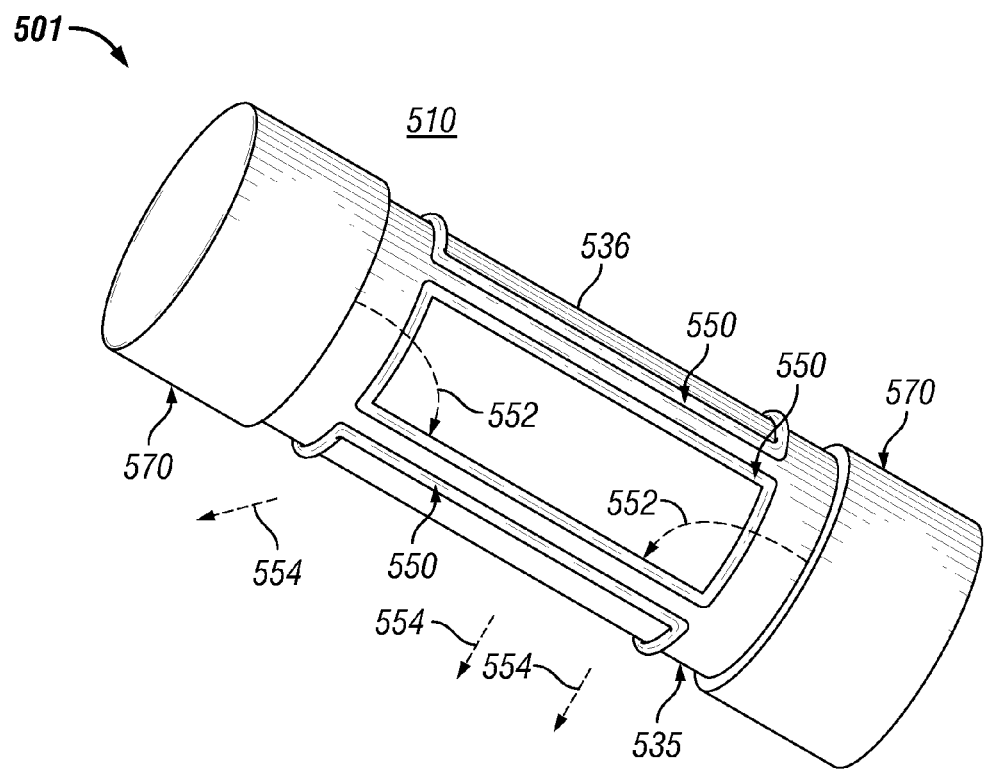
FIG. 5 shows a combination of directional antennas for electromagnetic mapping in a borehole in accordance with certain example embodiments.

FIG. 5 shows a portion of a BHA 501 that includes a combination of directional antennas for electromagnetic mapping in a borehole in accordance with certain example embodiments. Referring to FIGS. 1-5, the portion of the BHA 501 of FIG. 5 includes a combination of axial coils 570 and directional antenna elements 550. The directional antenna elements 550 of FIG. 5 are substantially similar to the directional antenna elements described above with respect to FIGS. 2-4, and the axial coils 570 are substantially similar to the axial coils 470 described above with respect to FIG. 4. Also, the tubing pipe 535 is substantially similar to the tubing pipes described above with respect to FIGS. 1-4. As shown in FIG. 5, the directional antenna elements 550 are disposed between the two axial coils 570.

There can be multiple axial coils 570 in a BHA 501. In certain example embodiments, when there are two axial coils 570, as shown in FIG. 5, each axial coil 570 is configured to generate time dependent magnetic fields 552 that are directed toward the other axial coil 570. As with the axial coil 470 of FIG. 4, the time dependent magnetic fields 552 generated by the axial coils 570 are transmitted in an axial direction along the length of the tubing pipe 535. As with the directional antennas described above with respect to FIG. 3, when an axial coil 570 is energized (is active or receives electrical power), the amount of electrical power can be constant or varied. Further, when multiple axial coils 570 are energized, the amount of electrical power received by one axial coil 570 can differ from the amount of electrical power received by one or more of the other axial coils 570. In such a case, any number of power sources (e.g., power source 131) can feed one or more of the active axial coils 570. For example, there may be a separate power source for each active axial coil 570. As another example, there may be a single power source feeding all active axial coils 570.

In this case, there are four directional antenna elements 550 oriented substantially symmetrically on the outer surface 536 of a tubing pipe 535 in a manner similar to the orientation of the directional antenna elements 350 shown above with respect to FIG. 3. In this example, the shape and size of each directional antenna element 550 is substantially similar to the shape and size of the other directional antennas 570. Each of the directional antenna elements 550 can be active or passive.

In certain example embodiments, the directional antenna elements 550 are individually controlled (e.g., active or passive, the amount of power when active) as described above to redirect the time dependent magnetic fields 552 flowing within the BHA 501 to become the time dependent magnetic fields 554 that flow substantially radially away from the tubing pipe 535 into the subterranean formation 510. In other words, one or more of the directional antenna elements 550 is selectively energized to direct the time dependent magnetic fields 552 to become the time dependent magnetic fields 554.

Figure 6:
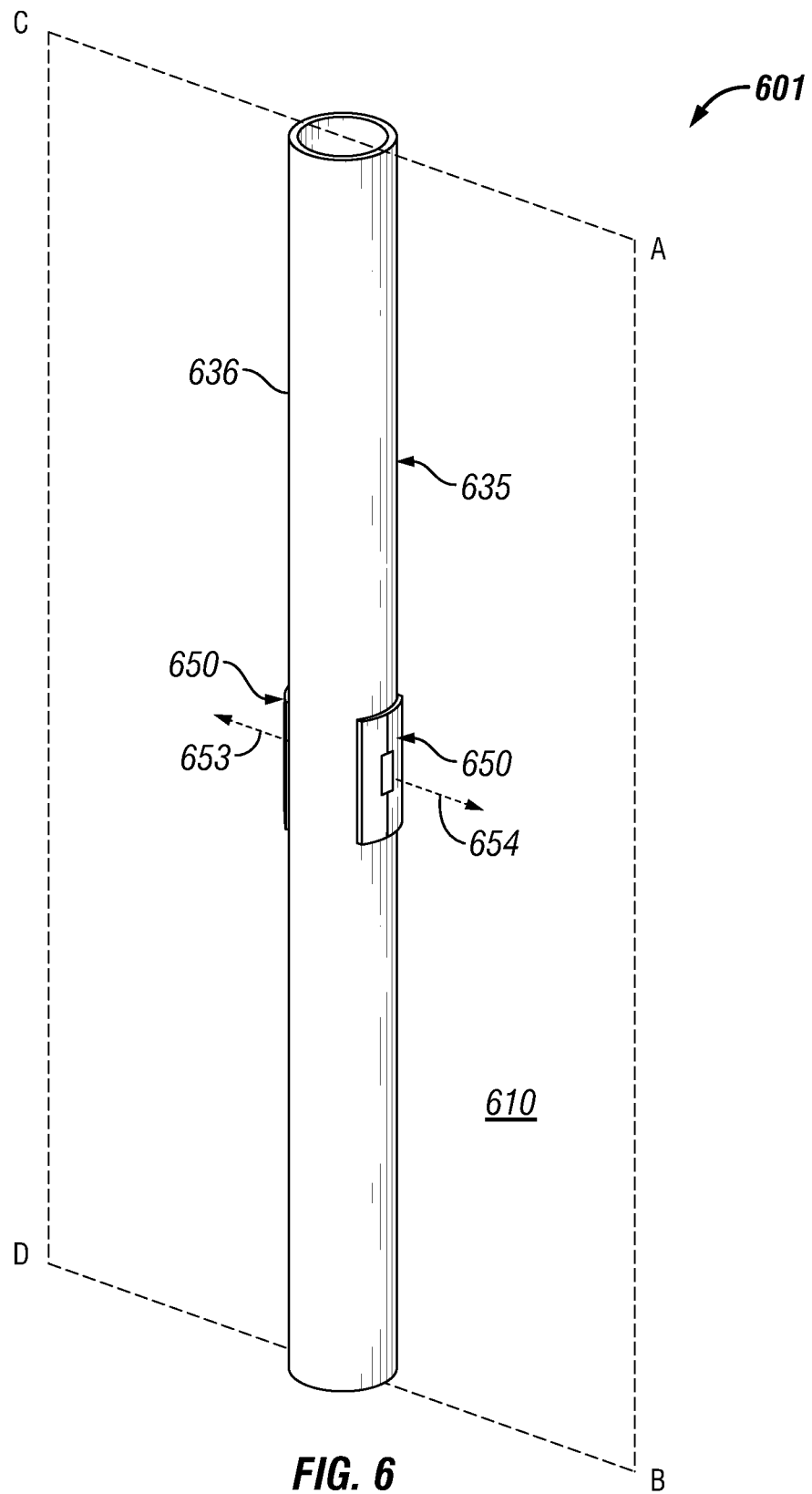
FIG. 6 shows another combination of directional antennas for electromagnetic mapping in a borehole in accordance with certain example embodiments.

FIG. 6 shows another portion of a BHA 601 that includes a combination of directional antennas for electromagnetic mapping in a borehole in accordance with certain example embodiments. Specifically, FIG. 6 shows a BHA 601 that is configured similar to the BHA 301 of FIG. 3, except that in this case there are only two directional antenna elements 650 that are disposed on opposite sides (approximately 180° apart) of the outer surface 636 of the tubing pipe 635. Each directional antenna element 650 has substantially the same shape, size, and characteristics as the other directional antenna element 650, and they are positioned at the same vertical position (along the length) on the tubing pipe 635. In this case, each directional antenna 650 is approximately 0.3 meters tall, and the tubing pipe 635 is approximately 3.0 meters tall. Further, the directional antenna elements 650 are positioned substantially in the middle (length-wise) of the tubing pipe 635.

Figure 7:
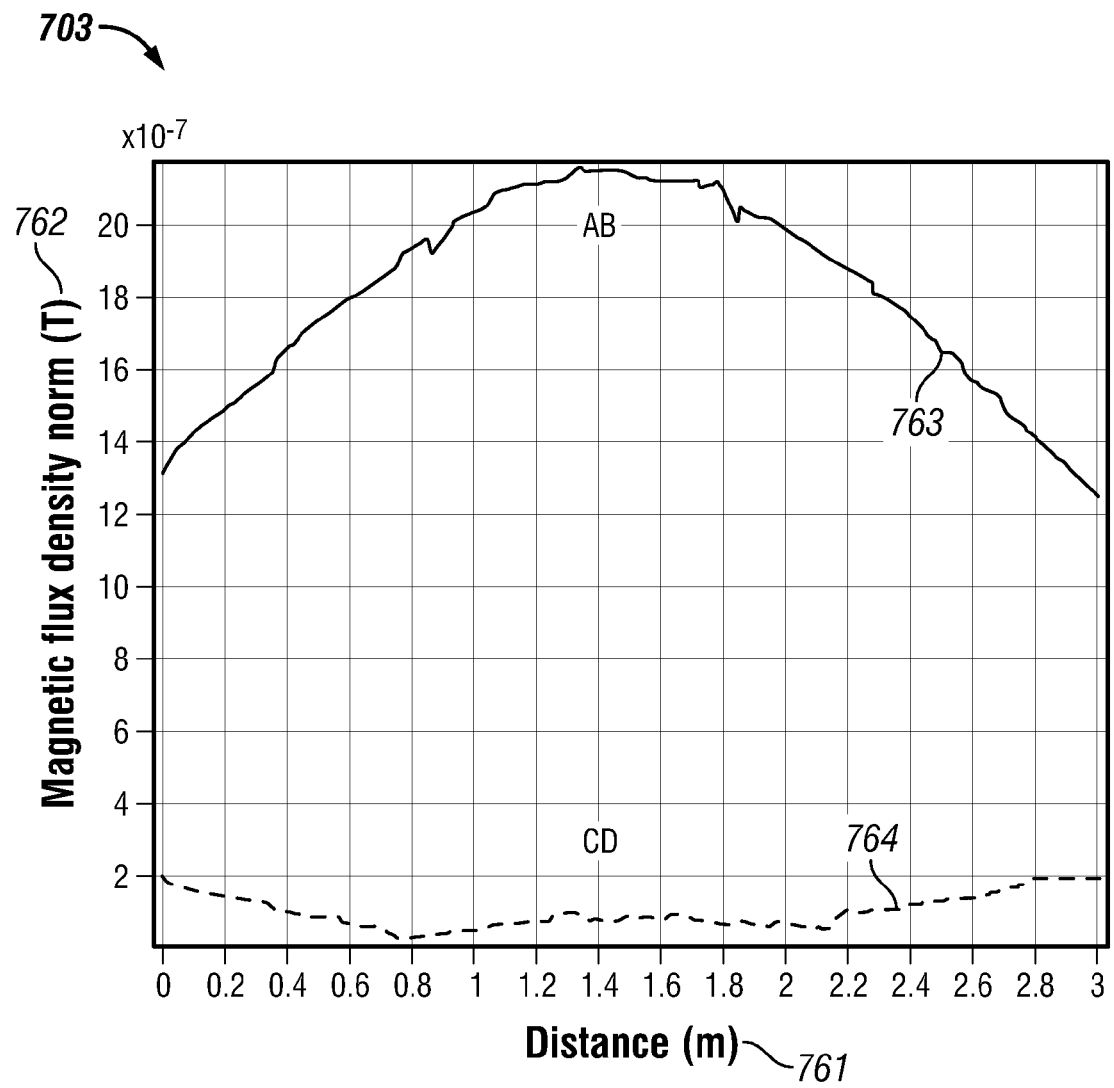
FIG. 7 shows a graphical representation of the magnitude of a magnetic field distributed by the combination of directional antennas from FIG. 6 in accordance with certain example embodiments.

The individual control of the two directional antenna elements 650 generate time dependent magnetic fields 654 that are transmitted radially away from the tubing pipe 635 through the directional antenna element 650 on the right in FIG. 6 into the subterranean formation 610. There can also be time dependent magnetic fields 653 that are transmitted radially away from the tubing pipe 635 through the directional antenna element 650 on the left in FIG. 6 into the subterranean formation 610. As shown in FIG. 7, based on the individual control of the directional antenna elements 650, the magnitude of the time dependent magnetic fields 653 is significantly less than the magnitude of the time dependent magnetic fields 654. In this case, since there are no axial coils in the BHA 601, at least one, if not both, of the directional antenna elements 650 are active while being individually and selectively controlled.

In this particular example, the directional antenna element 650 on the right receives a current of a magnitude flowing in one direction, while the directional antenna element 650 on the left receives a current of the same magnitude but flowing in the opposite direction. This effectively negates the time dependent magnetic fields 653 flowing out of the left directional antenna element 650, and sends strong time dependent magnetic fields 654 flowing out of the right directional antenna element 650 in FIG. 6.

FIG. 7 shows a graph 703 of the magnitude of a magnetic field distributed by the combination of directional antennas 650 from FIG. 6 in accordance with certain example embodiments. Generally, the graph 703 shows the magnitude 762 (expressed in this example as magnetic flux density measured in Teslas) of time dependent magnetic fields 2 meters from the outer surface 636 of the tubing pipe 635, measured in distance 761 from the top of the three meter tubing pipe 635 to the bottom of the three meter tubing pipe 635. Specifically, the graph 703 shows measurements of the time dependent magnetic fields 654 of FIG. 6 (shown in the graph 703 as trace 763) and of the time dependent magnetic fields 653 of FIG. 6 (shown in the graph 703 as trace 764), all taken 2 meters from the outer surface 634 of the tubing pipe 635.

Trace 763 shows that the time dependent magnetic field 654 starts at approximately $13 \times 10^{-7}$ T at the top of the tubing pipe 635 and two meters radially away from the right directional antenna element 650 (corresponding to point A in FIG. 6), increases to approximately $22 \times 10^{-7}$ T directly across from and two meters radially away from the right directional antenna element 650, and ending at approximately $13 \times 10^{-7}$ T at the bottom of the tubing pipe 635 and two meters radially away from the right directional antenna element 650 (corresponding to point B in FIG. 6). By contrast, trace 764 shows that the time dependent magnetic fields 653 starts at approximately $2 \times 10^{-7}$ T at the top of the tubing pipe 635 and two meters radially away from the left directional antenna element 650 (corresponding to point C in FIG. 6), decreases to less than $1 \times 10^{-7}$ T directly across from and two meters radially away from the left directional antenna element 650, and ending at approximately $2 \times 10^{-7}$ T at the bottom of the tubing pipe 635 and two meters radially away from the left directional antenna element 650 (corresponding to point D in FIG. 6).

Thus, graph 703, along with graph 903 of FIG. 9 below, shows that example embodiments can create directional magnetic fields that extend significant distances into the subterranean formation from the BHA. Consequently, the highly directional time dependent magnetic field generated by example embodiments allow a user to determine characteristics (e.g., resistivity) of a particular area of the subterranean formation, allowing the user to make more informed decisions about the field operation being conducted. This, in turn, allows for a number of benefits to the user, including but not limited to increased operational efficiency, more accurate identification of reserves holding subterranean resources, and recognition of potential hazardous conditions in the subterranean formation.

Figure 8:
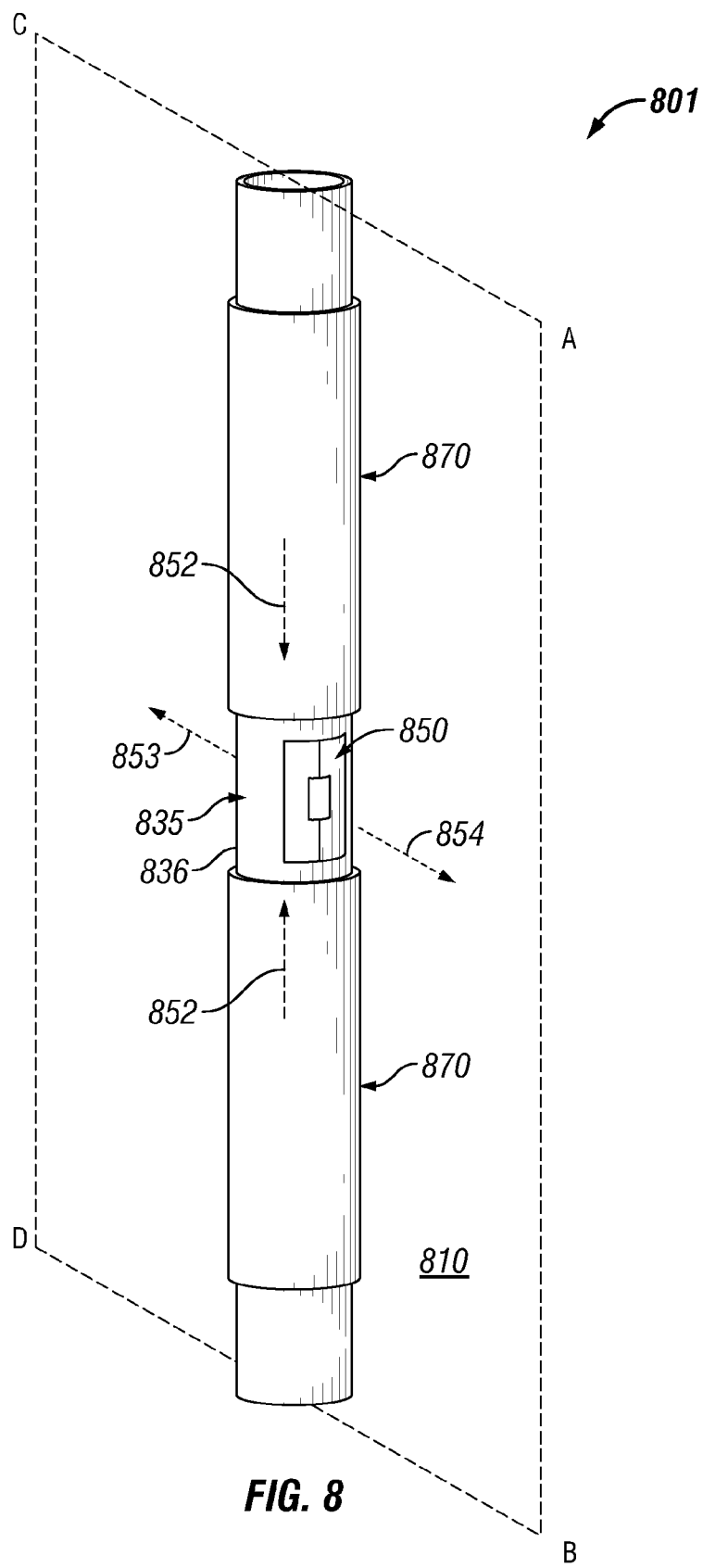
FIG. 8 shows yet another combination of directional antennas for electromagnetic mapping in a borehole in accordance with certain example embodiments.

FIG. 8 shows another portion of a BHA 801 that includes a combination of axial coils and directional antennas for electromagnetic mapping in a borehole in accordance with certain example embodiments. Specifically, FIG. 8 shows a BHA 801 that is configured similar to the BHA 501 of FIG. 5, except that in this case there is only one directional antenna element 850 that is disposed substantially in the middle (length-wise) of the tubing pipe 835 on the outer surface 836. Otherwise, the directional antenna element 850 is substantially the same as the directional antennas described above with respect to FIGS. 2-6. In this case, the directional antenna element 850 is approximately 0.3 meters tall, and the tubing pipe 835 is approximately 3.0 meters tall.

As with the case in FIG. 5, the axial coils 870 can be substantially identical to each other, but are directed toward each other. Each axial coils 870 is active, and so receives electric power to generate time dependent magnetic fields 852 that flow to the opposing axial coil 870. The directional antenna element 850 can be active or passive. When active, the directional antenna element 850 can be individually controlled, altering the amount and/or magnitude of the time dependent magnetic fields 854 that are derived from the magnetic waves 852. Whether active or passive, the directional antenna element 850 can redirect the time dependent magnetic fields 652 as the time dependent magnetic fields 854 by transmitting the time dependent magnetic fields 854 radially away from the tubing pipe 835 through the directional antenna element 850 in FIG. 8 into the subterranean formation 810. There can also be time dependent magnetic fields 853 that are transmitted through and radially away from the tubing pipe 835, between the axial coils 870 and adjacent to the directional antenna element 850, into the subterranean formation 810. As shown in FIG. 9, based on the individual control of the directional antenna element 850, the magnitude of the time dependent magnetic fields 853 is significantly less than the magnitude of the time dependent magnetic fields 854.

Figure 9:
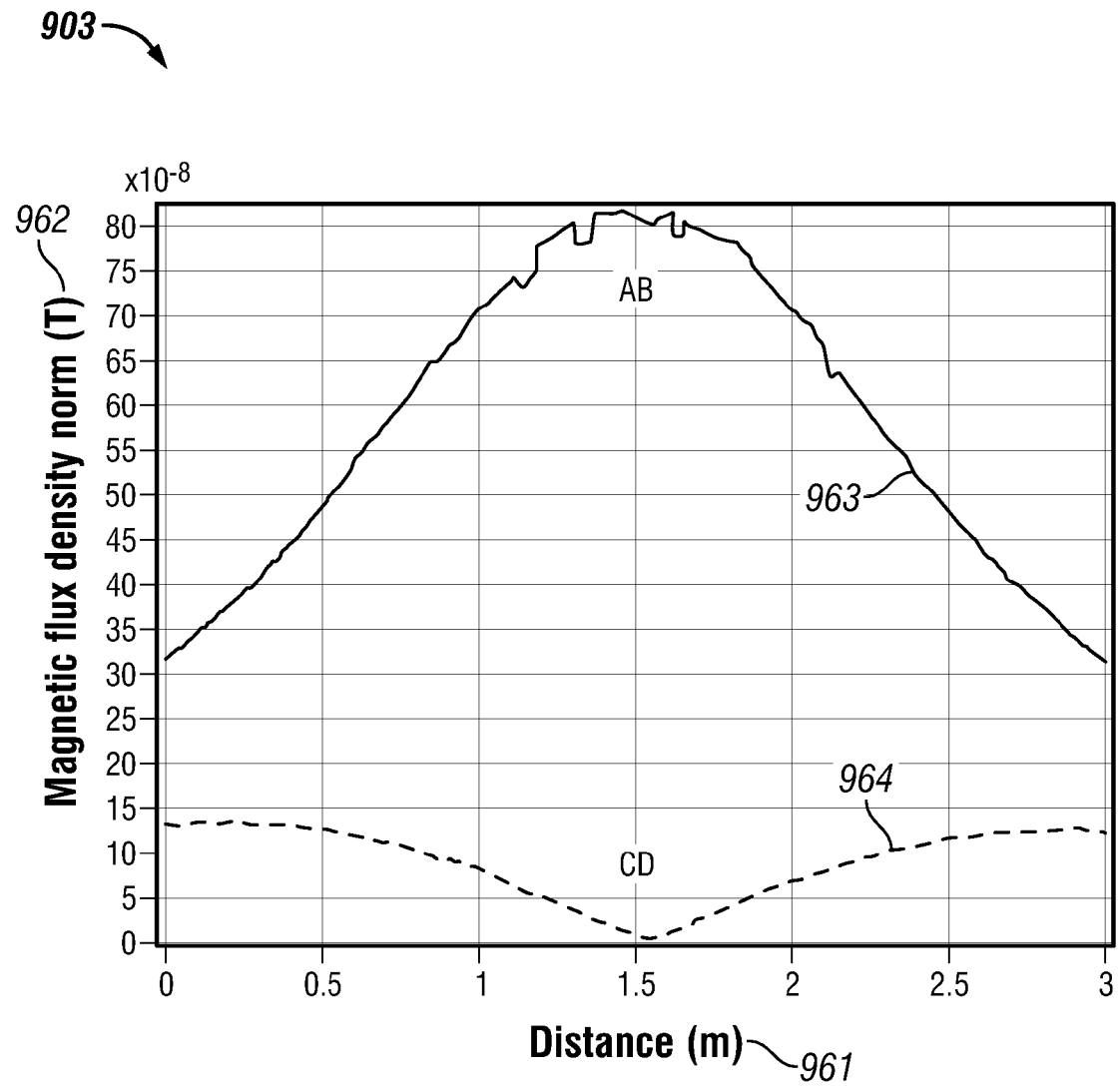
FIG. 9 shows a graphical representation of the magnitude of a magnetic field distributed by the combination of directional antennas from FIG. 8 in accordance with certain example embodiments.

FIG. 9 shows a graph 903 of the magnitude of a magnetic field distributed by the combination of the axial coils 870 and the directional antenna element 850 from FIG. 8 in accordance with certain example embodiments. Generally, the graph 903 shows the magnitude 962 (expressed in this example as magnetic flux density measured in Teslas) of magnetic fields 2 meters from the outer surface 836 of the tubing pipe 835, measured in distance 961 from the top of the three meter tubing pipe 835 to the bottom of the three meter tubing pipe 835. Specifically, the graph 903 shows measurements of the time dependent magnetic fields 854 of FIG. 8 (shown in the graph 903 as trace 963) and of the time dependent magnetic fields 853 of FIG. 8 (shown in the graph 903 as trace 964), all taken 2 meters from the outer surface 834 of the tubing pipe 835.

Trace 963 shows that the time dependent magnetic field 854 starts at approximately $32\times10^{-7}$ T at the top of the tubing pipe 835 and two meters radially away from the directional antenna element 850 (corresponding to point A in FIG. 8), increases to approximately $82\times10^{-7}$ T directly across from and two meters radially away from the directional antenna element 850, and ending at approximately $32\times10^{-7}$ T at the bottom of the tubing pipe 835 and two meters radially away from the directional antenna element 850 (corresponding to point B in FIG. 8). By contrast, trace 964 shows that the time dependent magnetic field 853 starts at approximately $13\times10^{-7}$ T at the top of the tubing pipe 835 and two meters radially away from the side of the tubing pipe 835 opposite the directional antenna element 850 (corresponding to point C in FIG. 8), decreases to less than $1\times10^{-7}$ T directly across from and two meters radially away from the side of the tubing pipe 835 opposite the directional antenna element 850, and ending at approximately $13\times10^{-7}$ T at the bottom of the tubing pipe 835 and two meters radially away from the side of the tubing pipe 835 opposite the directional antenna element 850 (corresponding to point D in FIG. 8).

Figure 10:
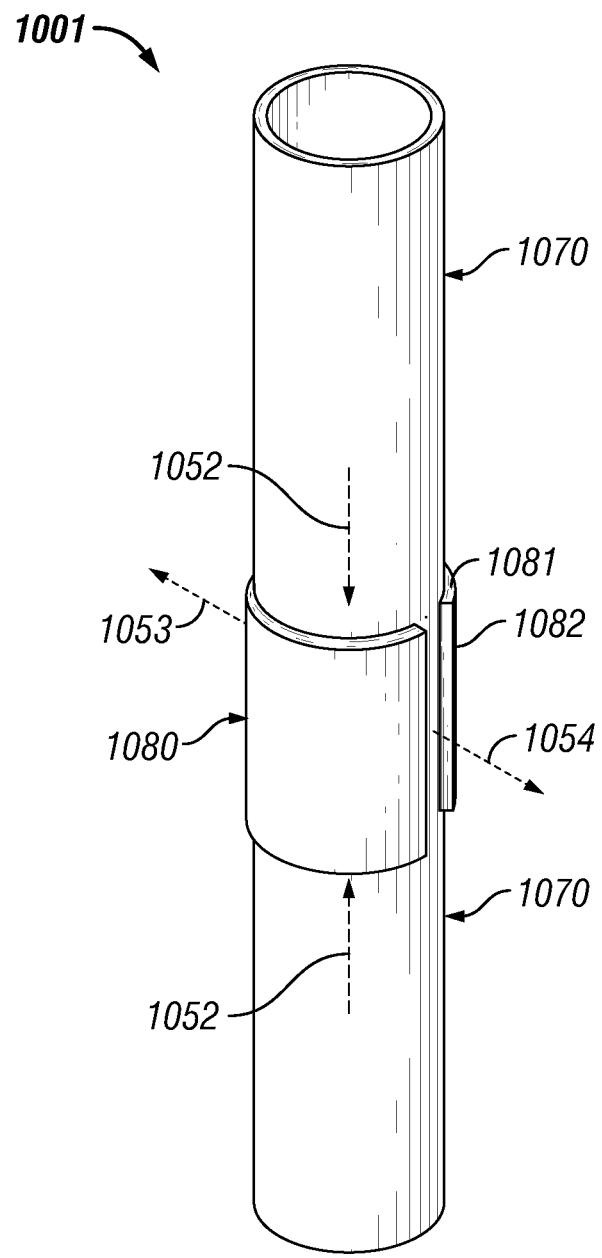
FIG. 10 shows still another combination of directional antennas for electromagnetic mapping in a borehole in accordance with certain example embodiments.

FIG. 10 shows another portion of a BHA 1001 that includes a combination of axial coils 1070 and a directional antenna 1080 for electromagnetic mapping in a borehole in accordance with certain example embodiments. In this case, there are two axial coils 1080 that are directed toward each other. The axial coils 1080 are substantially the same as the axial coils described above with respect to FIGS. 5 and 8.

The directional antenna 1080 performs the same functions as the directional antennas described above, but has a different configuration than those previously-described directional antennas. Specifically, the directional antenna 1080 of FIG. 10 has a body 1081 (in this case, a sheet) made of one or more electromagnetically conductive materials (e.g., copper, aluminum) that has a thickness equivalent to multiple electromagnetic penetration depths. The body 1081 can be disposed between the axial coils 1070 and/or shaped to fit around some or all of one or more components (e.g., one or both axial coils 1070, a tubing pipe (not shown)) of the BHA 1001. The body 1081 can have a thickness that is substantially uniform or variable along its length and/or width. The body 1081 can be a single piece or multiple pieces that are mechanically coupled to each other.

The directional antenna 1080 can have one or more gaps 1082 that traverse some or all of the thickness of the body 1081. For example, in this case, the gap 1082 traverses the entire thickness of the body 1081 and extends along the entire height of the body 1081. The directional antenna 1080 can be active or passive. In certain example embodiments, when AC power is provided to the axial coils 1070 and/or the directional antenna 1080, the time dependent magnetic fields (e.g., the time dependent magnetic fields 1052 generated by the axial coils 1070, the time dependent magnetic fields 1054 derived from the time dependent magnetic fields 1052 using the directional antenna 1080 to redirect the time dependent magnetic fields 1052) will very over time.

This variation in the time dependent magnetic fields flowing through the gap 1082 and the body 1081 of the directional antenna 1080 can create eddy currents in the conductive material of the body 1081. These eddy currents in the body 1081 of the directional antenna 1080 can generate time dependent magnetic fields that can distort what would otherwise be a substantially radial magnetic field (e.g., time dependent magnetic fields 1052) generated by the axial coils 1070.

Figure 11:
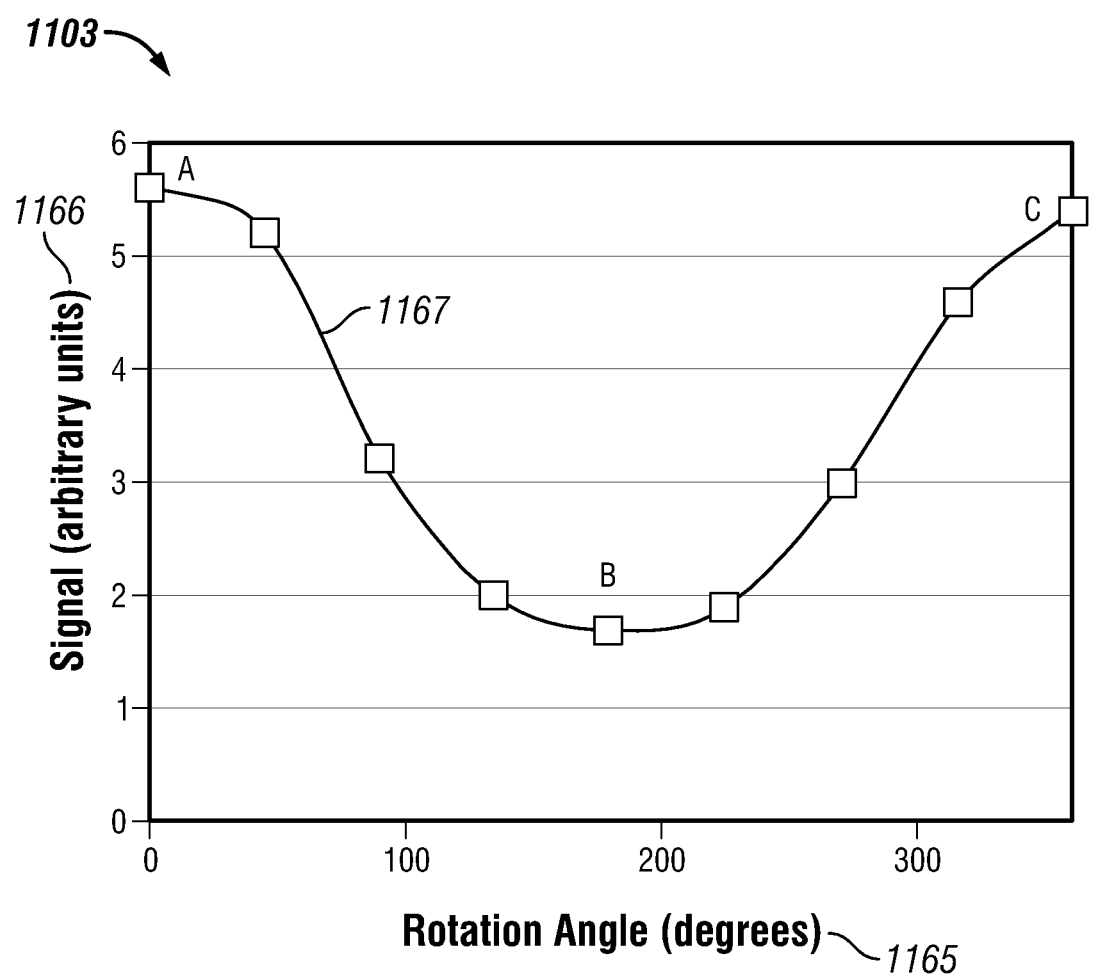
FIG. 11 shows a graphical representation of the magnitude of a magnetic field distributed by the combination of directional antennas from FIG. 10 in accordance with certain example embodiments.

FIG. 11 shows a graph 1103 of the relative strength 1166 of a magnetic field distributed by the combination of the axial coils 1070 and the directional antenna 1080 from FIG. 10 in accordance with certain example embodiments. Specifically, the graph 1103 shows measurements of the time dependent magnetic fields (e.g., time dependent magnetic fields 1054, time dependent magnetic fields 1053) of FIG. 10 (shown in the graph 1103 as trace 1167) taken at some constant distance from the directional antenna 1080 around the entire outer perimeter of the directional antenna 1080.

Points A and C on the trace 1167 represent the highest relative magnitude of the time dependent magnetic fields and correspond to time dependent magnetic fields 1054 that exit through the gap 1082. These points A and C correspond to 0° and 360°, respectively, on the horizontal axis 1165 of the graph 1103. Point B on the trace 1167 represents the lowest relative magnitude of the time dependent magnetic fields and correspond to time dependent magnetic fields 1053 that exit through the body 1081 substantially opposite from the gap 1082. Point B corresponds to 180° on the horizontal axis 1165 of the graph 1103. As measurements of the time dependent magnetic fields are taken closer to the gap 1082 and further away from the part of the body 1081 that is substantially opposite the gap 1082, the relative strength of the time dependent magnetic fields increases, as shown in trace 1167.

Figure 12:
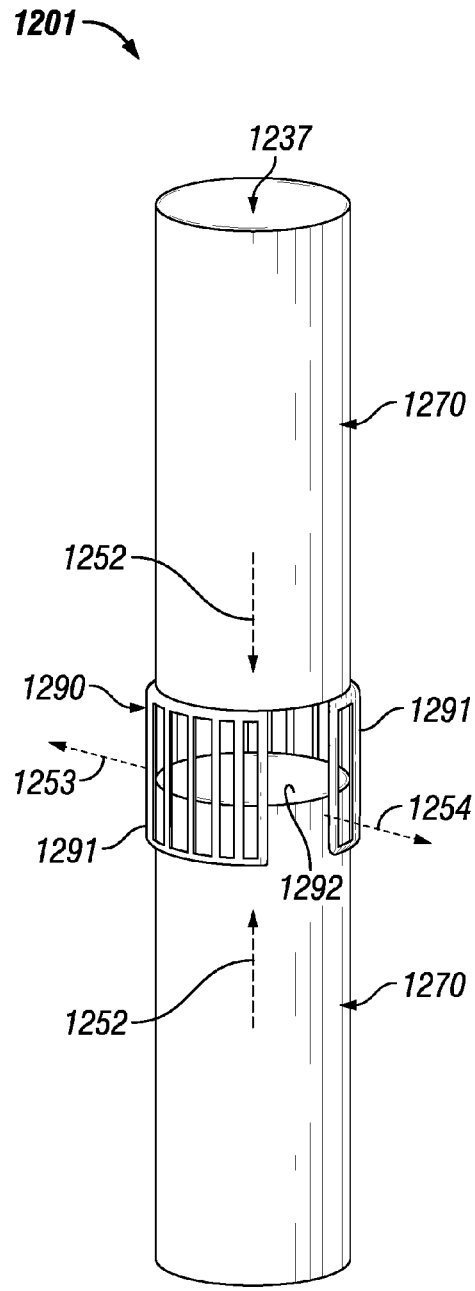
FIG. 12 shows yet another combination of directional antennas for electromagnetic mapping in a borehole in accordance with certain example embodiments.

FIG. 12 shows a portion of a BHA 1201 of yet another combination of axial coils 1270 and a directional antenna 1290 for electromagnetic mapping in a borehole in accordance with certain example embodiments. Referring to FIGS. 1-12, the axial coils 1270 are substantially the same as the axial coils described above. The directional antenna 1290 of FIG. 12 performs the same functions as the directional antennas described above, but has a different configuration than those previously-described directional antennas. Specifically, the directional antenna 1290 of FIG. 12 is a cage having a number of highly electromagnetically conductive elements 1291. These elements 1291 can be made of one or more of a number of electromagnetically conductive materials (e.g., copper, aluminum).

The directional antenna 1290, or portions thereof, can be disposed between the axial coils 1270 and/or shaped to fit around some or all of one or more components (e.g., one or both axial coils 1270, a tubing pipe (not shown)) of the BHA 1201. Each of the elements 1291 can have any of a number of sizes, shapes, and dimensions. The directional antenna 1250 can be a single element 1291 or multiple elements 1291 that are coupled to each other.

The directional antenna 1290 can have one or more gaps 1292 that traverse some or all of the thickness of the elements 1291. For example, in this case, there is one ring-shaped element 1291 on the top and bottom of the directional antenna 1290, and a number of segmented elements 1291 coupled to the top and bottom one ring-shaped elements 1291. A gap 1292 exists between each adjacent segmented elements 1291. The size of the gaps 1292 can be substantially the same as, or different than, one or more of the other gaps 1292. For example, the gap 1292 through which time dependent magnetic field 1254 is transmitted can be larger than the gap 1292 through which time dependent magnetic field 1253 is transmitted. As a result, the magnitude of time dependent magnetic field 1254 can be larger than the magnitude of time dependent magnetic field 1253.

The directional antenna 1290 can be active or passive. In certain example embodiments, when AC power is provided to the axial coils 1070 and/or the directional antenna 1290, the time dependent magnetic fields (e.g., the time dependent magnetic fields 1252 generated by the axial coils 1270, the time dependent magnetic fields 1254 derived from the time dependent magnetic fields 1252 using the directional antenna 1290 to redirect the time dependent magnetic fields 1252) will very over time. This variation in the time dependent magnetic fields flowing through the gaps 1292 of the directional antenna 1290 can create eddy currents in the conductive material of the elements 1291. These eddy currents in the elements 1291 of the directional antenna 1290 can generate time dependent magnetic fields that can distort what would otherwise be a substantially radial magnetic field (e.g., time dependent magnetic fields 1252) generated by the axial coils 1270.

Figure 13A:
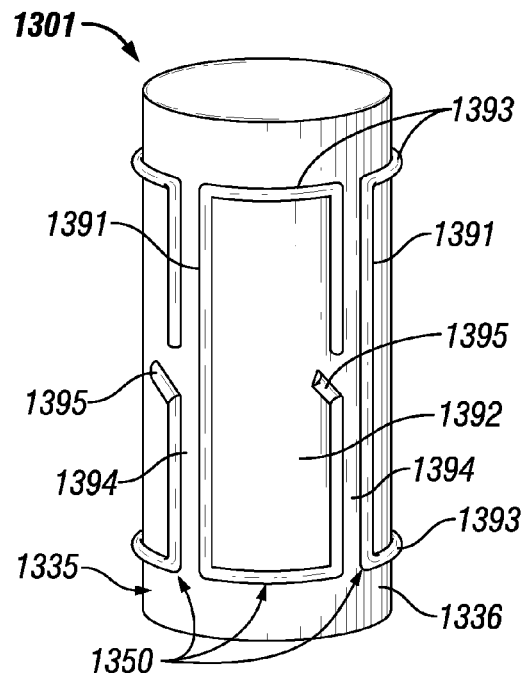
FIGS. 13A and 13B each shows a switchable directional antenna in accordance with certain example embodiments.
Figure 13B:
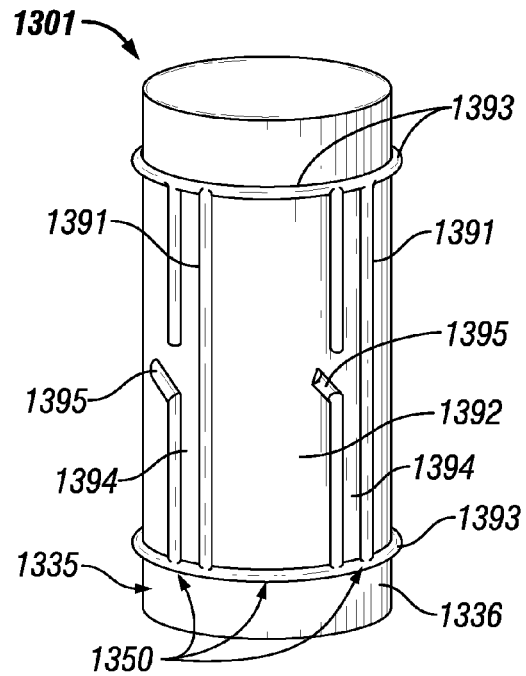

FIGS. 13A and 13B each shows a number of switchable directional antenna elements 1350 in accordance with certain example embodiments. Specifically, the directional antenna elements 1350 are substantially the same as the directional antenna elements 350 of FIG. 3, except as described below. Each directional antenna element 1350 in FIGS. 13A and 13B includes a pair of side elements 1391 and a pair of arc-shaped elements 1393 located at the top and the bottom of the directional antenna element 1350. Each of the side elements 1391 and the arc-shaped elements 1393 can be a single piece or separate pieces that are coupled to each other. Each directional antenna element 1350 bounds a hole 1392 through which a time dependent magnetic field can flow. A directional antenna element 1350 can be separated from an adjacent directional antenna element 1350 by a gap 1394.

Each element (e.g., a side element 1391 (as shown in FIGS. 13A and 13B), an arc-shaped element 1393) can include a switch 1395. When the switch 1395 is closed, the side elements 1391 and the arc-shaped elements 1393 forms a continuous loop of conductor that carry current, thus generating a time dependent magnetic field. Each switch 1395, when opened, creates a separation (disrupts continuity) within an element (in this case, side element 1391) of the directional antenna element 1350, creating an "open circuit" that prevents electromagnetic flow from occurring therethrough. Conversely, when a switch 1395 is closed, a continuity is created between adjacent elements (side elements 1391 and arc-shaped elements 1393), which creates a "closed circuit" that allows electromagnetic flow to occur therethrough. The switches 1395 can be operated electrically (e.g., using transistors, field effect transistors), hydraulically, mechanically, and/or using any other method. By operating one or more switches 1395, the direction and magnitude of one or more time dependent magnetic fields can be controlled. Further, if adjacent directional antenna elements 1350 are electrically coupled to each other (as shown, for example, in FIG. 13B), the size of a number of holes 1392 can be controlled, which in turn controls the magnitude of the time dependent magnetic fields flowing through such holes 1392.

Referring to FIGS. 13A and 13B, the gaps 1394 between elements 1391 of adjacent directional antenna elements 1350 are exaggerated for visibility. In actuality, the gaps 1394 can be much smaller (adjacent elements 1391 much closer together) so as to block a magnetic field from entering one or more gaps 1394. In addition, or in the alternative, one or more portions of the directional antenna elements 1350 can be electrically coupled to each other. For example, the arc-shaped elements 1393 on the top and/or bottom of a directional antenna element 1350 can be electrically coupled to an adjacent arc-shaped element 1393. In such a case, multiple switches 1395 may be required to isolate one or more directional antenna elements 1350.

A switch 1395 can be placed on one of or both a top and a bottom arc-shaped element 1393 (e.g., on the top and on the bottom of the directional antenna 1350) between elements 1391. In addition, or in the alternative, a switch can be placed on one or more side elements 1391. In such a case, the directional antenna 1350 can be multiple directional antenna elements that are disposed around the outer perimeter of the BHA. If a side element 1391 is part of two directional antenna elements 1350, then opening a switch on the side element 1391 could combine the two directional antenna elements into a single directional antenna element. Although described as arc-shaped, the elements 1393 can have one or more of a number of shapes, including but not limited to linear, sawtooth, and random.

Figure 14:
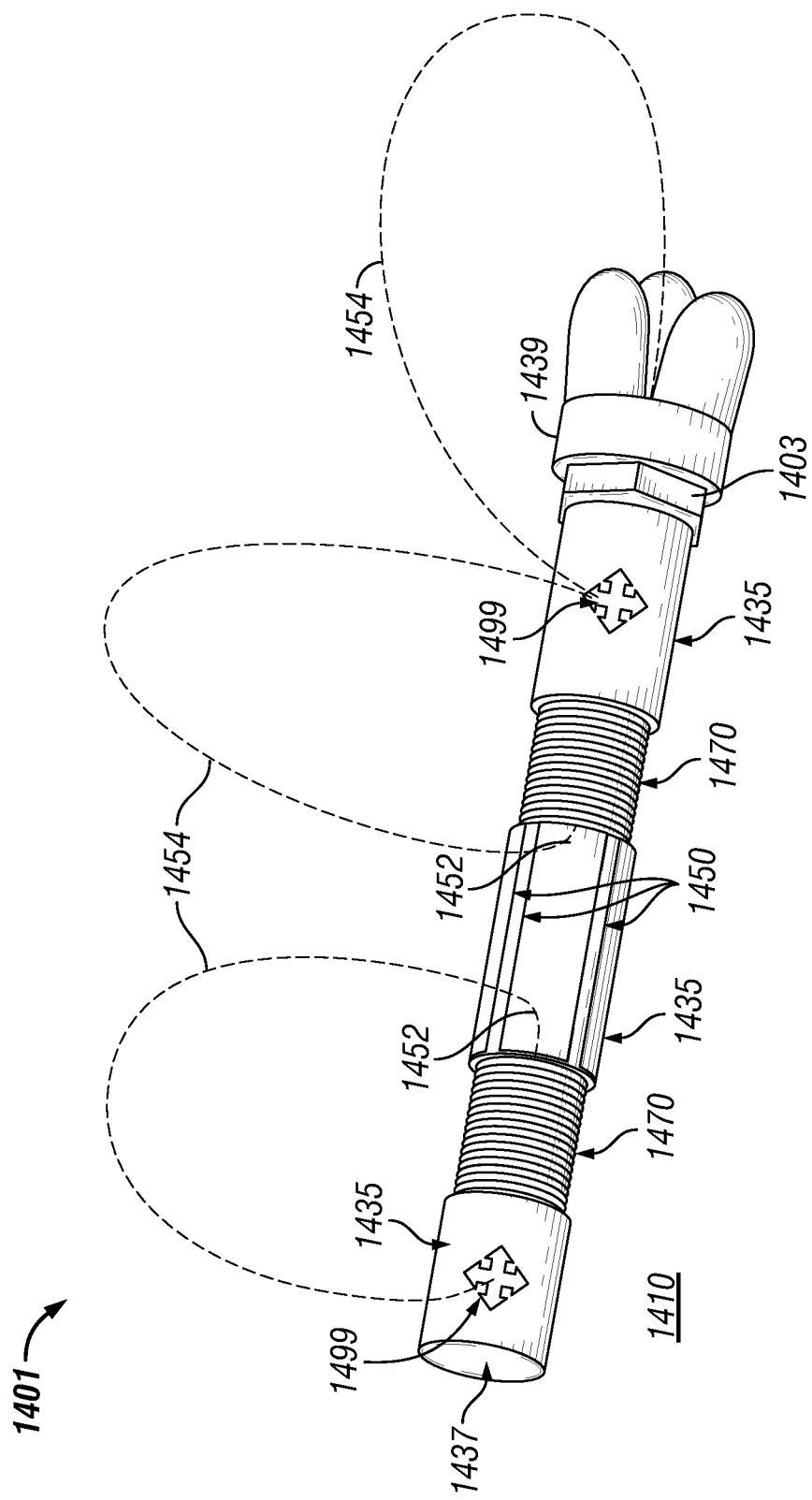
FIG. 14 shows a system for electromagnetic mapping in a borehole in accordance with certain example embodiments.

FIG. 14 shows a portion of a BHA 1401 that includes a system for electromagnetic mapping in a borehole in accordance with certain example embodiments. Referring to FIGS. 1-14, the BHA 1401 of FIG. 14 includes two axial coils 1470 that are directed toward each other, four directional antennas 1450 disposed on a tubing pipe 1435 disposed between the axial coils 1470, one or more wrench flats 1403, a drill bit 1439, and one or more receivers 1499 disposed on one or more tubing pipes 1435. All components of the BHA 1401 of FIG. 14 are substantially similar to the corresponding components of BHAs discussed above, except as described below.

Magnetic fields travel in a loop, starting from one magnetic source and ending with another magnetic source having an opposite polarity. In this case, the source generating the time dependent magnetic field 1452 and 1454 are the axial coils 1470 and one or more of the directional antennas 1450, while the source receiving the time dependent magnetic field 1454 are the receivers 1499. Each receiver can be disposed on some portion (in this case, a tubing pipe 1435) of the BHA 1401 that is adjacent to the places where the time dependent magnetic field 1454 are transmitted into the subterranean formation 1410. A receiver can be any of a number of devices known in the art that can receive time dependent magnetic field and allow a user/user system to process those time dependent magnetic field. An example of such a receiver can include a 3-axis magnetometer.

Figure 15:
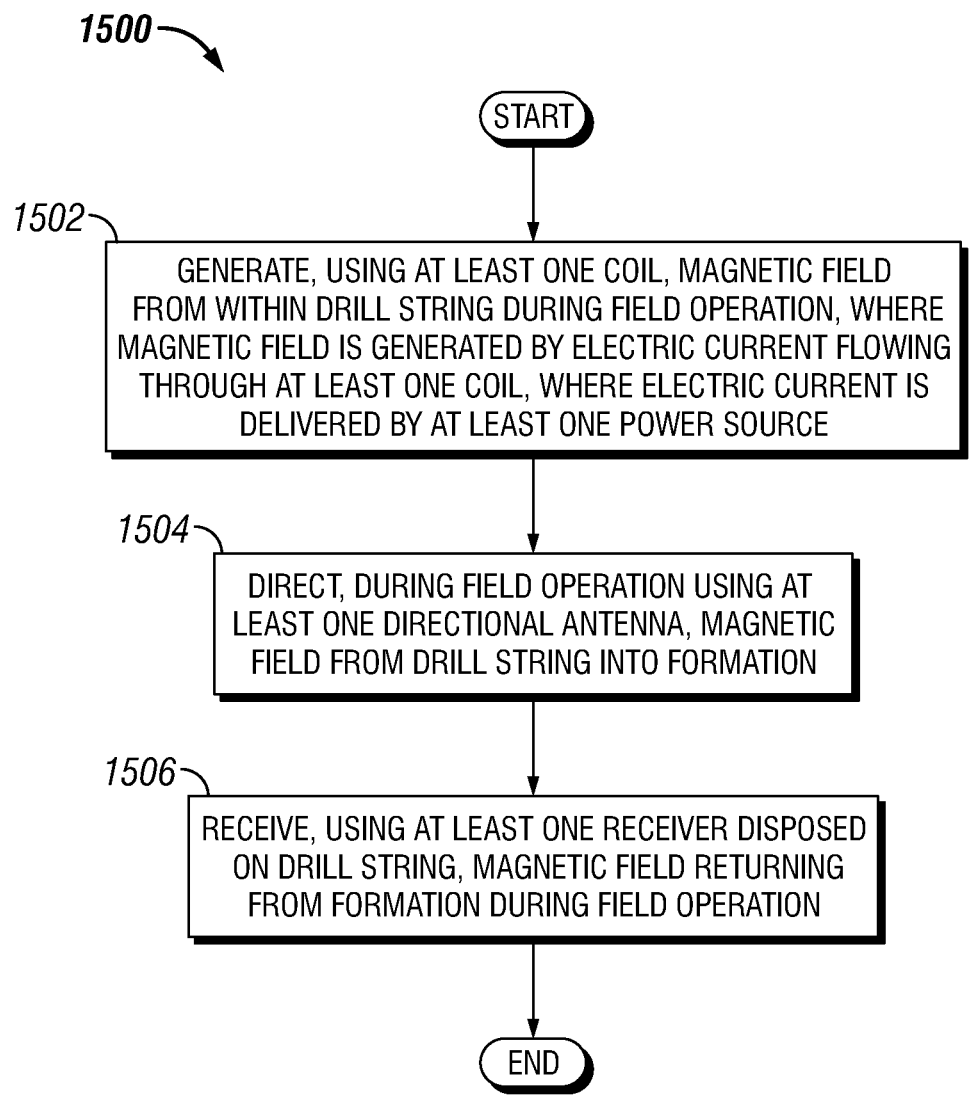
FIG. 15 shows a flowchart for a method of electromagnetically mapping a borehole using directional antennas in accordance with certain example embodiments.

FIG. 15 shows a flowchart for a method 1500 of electromagnetically mapping a borehole using directional antennas during a field operation in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order. In addition, a person of ordinary skill in the art will appreciate that additional steps not shown in FIG. 15 may be included in performing this method. Accordingly, the specific arrangement of steps should not be construed as limiting the scope.

Referring now to FIGS. 1-15, the example method 1500 begins at the START step and proceeds to step 1502, where a magnetic field from within a tubing string is generated during the field operation. The magnetic field can be generated by an axial coil and/or a directional antenna. The magnetic field can be generated by an electric current flowing through the axial coil and/or directional antenna. In such a case, the electric current can be delivered by at least one power source. In certain example embodiments, the magnetic field can be varied to generate a varied magnetic field. The magnetic field can be varied during the field operation. The at least one coil can include at least one axial coil, where the at least one directional antenna can include at least one side coil, where the magnetic field is generated by at least one axial coil and delivered axially along the tubing string from the at least one axial coil to the at least one side coil, where the at least one side coil directs the magnetic field into the formation.

In step 1504, the magnetic field can be directed from the tubing string into the subterranean formation. The magnetic field can be directed into the subterranean formation during the field operation using at least one directional antenna. If the magnetic field is varied, the varied magnetic field can be directed from the tubing string into the formation. The varied magnetic field can be directed during the field operation using at least one directional antenna. In certain example embodiments, the varied magnetic field generates eddy currents. In such a case, the eddy currents can increase a magnitude of the magnetic field in the formation.

A directional antenna can include a number of side coils, where the magnetic field is varied by delivering an increased electric current to one of the side coils and a relatively decreased electric current to a remainder of the side coils. In addition, or in the alternative, the magnetic field is varied by selectively adjusting a size of each of the side coils. In certain example embodiments, the tubing string can be rotated while directing the magnetic field from the tubing string into the formation and while receiving the magnetic field returning from the formation during the field operation.

In step 1506, the magnetic field returning from the formation during the field operation is received. The magnetic field can be received using at least one receiver disposed on the tubing string. If the magnetic field is varied, the varied magnetic field can be received when returning from the formation during the field operation. The varied magnetic field can be received using at least one receiver disposed on the tubing string. In certain example embodiments, the varied magnetic field received by the at least one receiver is used to determine resistivities within the formation surrounding the tubing string.

The systems and methods described herein provide directional antennas for electromagnetic mapping in a borehole. Example embodiments allow for more reliable and timely data (e.g., resistivity) about a subterranean formation that is presently undergoing a field operation. Example embodiments also allow for increased operational efficiency, reduced time to perform a field operation, conservation of materials, and cost savings.

Example embodiments generate magnetic fields that are forced to bend through a wide area of space within a subterranean formation by using the height of the high magnetic susceptibility section as one or more example directional antenna. In some cases, multiple (e.g., three or more) directional antennas can be used to direct the magnetic field in various directions within the subterranean formation. The use of the high magnetic susceptibility sections and axial coils in example embodiments also concentrates a magnetic field in front of the bottom hole assembly. The bottom hole assembly may include receivers and drilling equipment such as cutting bits. Example embodiments can be positioned at substantially any point along the tubing string, including proximate to the bottom hole assembly, where relatively higher mechanical stresses are experienced. Certain example embodiments are directed to directing magnetic fields into a subterranean formation using passive shields that depend on the generation of eddy currents in high conductivity materials placed close to the directional antennas.

The magnetic field generated using example embodiments can be used dynamically for the study of resistivity in the formation. That is, since a static magnetic field does not generate eddy currents (which can be used to determine resistivity) in the conducting parts of the subterranean formation, example embodiments use dynamic time dependent magnetic fields to create eddy currents. As the magnetic field is varied more rapidly using example embodiments, the eddy currents increase and, in turn, the time dependent magnetic fields returned to the receivers from the subterranean formation is larger. The high strength steel tubing pipes can also generate eddy currents that slow or otherwise control the speed of the changes in magnetic field using example embodiments. In addition, example embodiments can combine known eddy current suppression techniques with example directional antennas to increase the time dependent magnetic fields transmitted through the subterranean formation.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A bottom hole assembly used for a field operation, the bottom hole assembly comprising:
    at least one directional antenna disposed on an outer surface of a first tubing pipe of a tubing string, wherein the at least one directional antenna receives a first electric current from at least one power source, wherein the first electric current generates a first magnetic field that radiates from the at least one directional antenna into a formation during the field operation; and
    at least one receiver disposed on a second tubing pipe of the tubing string, wherein the at least one receiver receives the first magnetic field returning from the formation,
    wherein the at least one directional antenna comprises a plurality of directional antennas, wherein the plurality of directional antennas receive a plurality of electric currents, wherein the plurality of electric currents comprises the first electric current, wherein each electric current of the plurality of electric currents is adjustable independently of a remainder of the plurality of electric currents received by a remainder of the directional antennas,
    wherein the first electric current flowing through one directional antenna of the plurality of directional antennas has a higher amperage than an amperage of each of the remainder of the plurality of electric currents flowing through the remainder of the plurality of directional antennas.

2. The bottom hole assembly of claim 1, wherein the at least one directional antenna is rectangular in shape.

3. The bottom hole assembly of claim 1, wherein the plurality of directional antennas are disposed symmetrically around a perimeter of a section of the first tubing pipe.

4. The bottom hole assembly of claim 1, further comprising:
a first axial coil disposed in line with the tubing string and located adjacent to the first tubing pipe, wherein the first axial coil receives a second electric current from the at least one power source, wherein the plurality of electric currents comprises the second electric current, wherein the second electric current generates a second magnetic field that is directed from the first axial coil in an axial direction along a length of the tubing string toward the at least one directional antenna, wherein the second magnetic field is redirected by the at least one directional antenna through the at least one directional antenna and into the formation,
wherein the at least one receiver receives the second magnetic field returning from the formation.

5. The bottom hole assembly of claim 4, further comprising:
a second axial coil disposed in line with the tubing string and located adjacent to the first tubing pipe on a side of the first tubing pipe opposite the first axial coil, wherein the second axial coil receives a third electric current from the at least one power source, wherein the plurality of electric currents comprises the third electric current, wherein the third electric current generates a third magnetic field that is directed from the second axial coil in the axial direction along the tubing string toward the at least one directional antenna, wherein the third magnetic field is redirected by the at least one directional antenna through the at least one directional antenna and into the formation,
wherein the at least one receiver receives the third magnetic field returning from the formation.

6. The bottom hole assembly of claim 5, further comprising:
a drill bit disposed at a distal end of the tubing string, wherein the second axial coil further generates a fourth magnetic field that radiates from the second axial coil in the axial direction along the tubing string toward the drill bit,
wherein the at least one receiver receives the fourth magnetic field returning from the formation.

7. A bottom hole assembly used for a field operation, comprising:
a first axial coil disposed in line with a tubing string, wherein the first axial coil receives a first electric current from at least one power source, wherein the first electric current generates a first magnetic field that radiates from the first axial coil in an axial direction along the tubing string;
a directional antenna disposed adjacent to the first axial coil and having at least one hole in the axial direction, wherein the first magnetic field radiates through the at least one hole in the directional antenna into a formation during the field operation; and
at least one receiver disposed on the tubing string, wherein the at least one receiver receives the first magnetic field returning from the formation,
wherein the directional antenna is electrically passive, and wherein the directional antenna comprises a plurality of holes that are configured by a plurality of switches.

8. The bottom hole assembly of claim 7, further comprising:
a second axial coil disposed in line with the tubing string and located adjacent to the directional antenna on a side of the directional antenna opposite the first axial coil, wherein the second axial coil receives a second electric current from the at least one power source, wherein the second electric current generates a second magnetic field that radiates from the second axial coil in the axial direction along the tubing string toward the directional antenna, wherein the second magnetic field is redirected by the directional antenna through the at least one gap and into the formation,
wherein the at least one receiver receives the second magnetic field returning from the formation.

9. A method for electromagnetically mapping a borehole using directional antennas during a field operation, the method comprising:
generating a magnetic field from within a tubing string during the field operation, wherein the magnetic field is generated by an electric current flowing through at least one coil, wherein the electric current is delivered by at least one power source;
directing, during the field operation using at least one directional antenna, the magnetic field from the tubing string into a formation;
receiving, using at least one receiver disposed on the tubing string, the magnetic field returning from the formation during the field operation;
varying, during the field operation, the magnetic field to generate a varied magnetic field;
directing, during the field operation using at least one directional antenna, the varied magnetic field from the tubing string into the formation; and
receiving, using at least one receiver disposed on the tubing string, the varied magnetic field returning from the formation during the field operation,
wherein the at least one directional antenna comprises a plurality of side coils, wherein the magnetic field is varied by selectively adjusting a size of each of the plurality of side coils.

10. The method of claim 9, wherein the varied magnetic field generates a plurality of eddy currents, wherein the plurality of eddy currents increases a magnitude of the magnetic field in the formation.

11. The method of claim 10, wherein the varied magnetic field received by the at least one receiver is used to determine a plurality of resistivities within the formation surrounding the tubing string.

12. The method of claim 9, wherein the at least one directional antenna comprises a plurality of side coils, wherein the magnetic field is varied by delivering an increased electric current to one of the plurality of side coils and a relatively decreased electric current to a remainder of the plurality of side coils.

13. The method of claim 9, further comprising:
rotating the tubing string while directing the magnetic field from the tubing string into the formation and while receiving the magnetic field returning from the formation during the field operation.

14. The method of claim 9, wherein the at least one coil comprises at least one axial coil, wherein the at least one directional antenna comprises at least one side coil, wherein the magnetic field is generated by at least one axial coil and delivered axially along the tubing string from the at least one axial coil to the at least one side coil, wherein the at least one side coil directs the magnetic field into the formation.

* * * * *